United States Patent
Sievers et al.

(10) Patent No.: US 12,487,340 B2
(45) Date of Patent: Dec. 2, 2025

(54) DEVICE AND METHOD FOR ISOLATING A TRIGGER SIGNAL OF A LIDAR SENSOR AND TEST SYSTEM

(71) Applicant: dSPACE GmbH, Paderborn (DE)

(72) Inventors: Gregor Sievers, Paderborn (DE); Frank Schuette, Paderborn (DE); Andreas Himmler, Paderborn (DE); Jan Lachmair, Bielefeld (DE); Jens Hagemeyer, Bielefeld (DE); Marco Schmidt, Bielefeld (DE)

(73) Assignee: dSPACE GMBH, Paderborn (DE)

( * ) Notice: Subject to any disclaimer, the term of this patent is extended or adjusted under 35 U.S.C. 154(b) by 933 days.

(21) Appl. No.: 17/695,164

(22) Filed: Mar. 15, 2022

(65) Prior Publication Data

US 2022/0291355 A1  Sep. 15, 2022

(30) Foreign Application Priority Data

Mar. 15, 2021 (DE) ...................... 10 2021 106 220.9

(51) Int. Cl.
*G01S 7/4861* (2020.01)
*G01S 7/481* (2006.01)
(Continued)

(52) U.S. Cl.
CPC .......... *G01S 7/4861* (2013.01); *G01S 7/4816* (2013.01); *G01S 7/4873* (2013.01); *G02F 1/093* (2013.01); *G01S 7/4817* (2013.01)

(58) Field of Classification Search
CPC ........ G01S 7/481; G01S 7/497; G01S 7/4802; G01S 7/4804; G01S 7/4811;
(Continued)

(56) References Cited

U.S. PATENT DOCUMENTS 4,432,640 A * 2/1984 Grage .................. G01S 7/4972
356/4.02
6,330,117 B1  12/2001 Seo
(Continued)

FOREIGN PATENT DOCUMENTS

CN  1244927 A  2/2000
CN  109196378 A  1/2019
(Continued)

OTHER PUBLICATIONS

P.I. Richter et al., Field Calibration and Sensitivity Analysis of Coherent Infrared Differential Absorption Lidars, 1996, pp. 697-699 [online], [retrieved Mar. 19, 2025], retrieved from the Internet <URL: https://ieeexplore.ieee.org/stamp/stamp.jsp?tp=&arnumber=516446>. (Year: 1996).*

(Continued)

*Primary Examiner* — Jennifer D. Carruth
(74) *Attorney, Agent, or Firm* — Muncy, Geissler, Olds & Lowe, P.C.

(57) ABSTRACT

A device and to a method for isolating a trigger signal for a test system of a LiDAR sensor, having an optical element, which is arranged in a signal pat of the trigger signal before a converging lens or a trigger detector and which is designed to allow the trigger signal to pass and to at least partially absorb a back reflection, in particular reflected off a surface, of the trigger signal that has passed through the optical element. A test system for a LiDAR sensor is also provided.

20 Claims, 6 Drawing Sheets

(51) Int. Cl.
*G01S 7/487* (2006.01)
*G02F 1/09* (2006.01)

(58) Field of Classification Search
CPC .... G01S 7/4816; G01S 7/4817; G01S 7/4861;
G01S 7/4873; G01S 17/42; G01S 17/894;
G02F 1/093
See application file for complete search history.

(56) References Cited

U.S. PATENT DOCUMENTS

| | | | |
|---|---|---|---|
| 8,399,872 B2 | 3/2013 | Bates et al. | |
| 8,687,173 B2 | 4/2014 | Rezk et al. | |
| 8,718,977 B2 * | 5/2014 | Blanco | G01S 7/497 |
| | | | 702/182 |
| 9,110,154 B1 | 8/2015 | Bates et al. | |
| 9,935,424 B2 | 4/2018 | Zheng et al. | |
| 10,119,816 B2 * | 11/2018 | Slotwinski | G01S 17/34 |
| 10,955,533 B2 | 3/2021 | Konrad | |
| 11,762,072 B2 * | 9/2023 | Sugawara | G01S 17/10 |
| | | | 356/5.01 |
| 11,789,149 B2 * | 10/2023 | Koonath | G02B 6/2813 |
| | | | 356/5.14 |
| 2011/0127411 A1 | 6/2011 | Bates et al. | |
| 2016/0274305 A1 * | 9/2016 | Ye | H04B 10/503 |
| 2018/0003803 A1 | 1/2018 | Kakani et al. | |
| 2018/0191446 A1 | 7/2018 | Blanks | |
| 2018/0259628 A1 | 9/2018 | Plank et al. | |
| 2020/0355608 A1 | 11/2020 | Sugawara et al. | |
| 2022/0291364 A1 * | 9/2022 | Sievers | G01S 17/931 |

FOREIGN PATENT DOCUMENTS

| | | | |
|---|---|---|---|
| DE | 102007057372 A1 | 5/2009 | |
| DE | 102014217524 A1 | 3/2016 | |
| DE | 112010004675 B4 | 8/2017 | |
| DE | 102017110790 A1 | 11/2018 | |
| DE | 102019106129 A1 | 5/2020 | |
| EP | 2955543 A1 | 12/2015 | |
| JP | S57124348 A | 8/1982 | |
| JP | H07134177 A | 5/1995 | |
| JP | H09318732 A | 12/1997 | |
| JP | 2795263 B2 * | 9/1998 | |
| JP | 3206256 B2 * | 9/2001 | |
| JP | 2013513106 A | 4/2013 | |
| JP | 2015111160 A | 6/2015 | |
| JP | 2018513556 A | 5/2018 | |
| JP | 2020183914 A | 11/2020 | |
| WO | WO 2016058135 A1 | 4/2016 | |
| WO | WO2018211056 A1 | 11/2018 | |

OTHER PUBLICATIONS

Santiago Royo et al., An Overview of Lidar Imaging Systems for Autonomous Vehicles, 9 Applied Sciences 4093-1 to 4093-37 (2019). (Year: 2019).*

Trevor English, What is LiDAR Technology and What are Its Main Applications?, 2020, pp. 1-7 [online], [retrieved Mar. 20, 2025], retrieved from the Internet <URL: https://interestingengineering.com/science/what-is-lidar-technology-and-what-are-its-main-applications>. (Year: 2020).*

Daniel Bastos et al., An Overview of LiDAR Requirements and Techniques for Autonomous Driving, 2021, pp. 1-6 [online], [retrieved Mar. 19, 2025], retrieved from the Internet <URL: https://ieeexplore.ieee.org/stamp/stamp.jsp?tp=&arnumber=9435580>. (Year: 2021).*

German Office Action dated Nov. 11, 2021 in corresponding application 10 2021 106 220.9.

Japanese Office Action dated Feb. 28, 2023 in corresponding application 2022-039382.

* cited by examiner

DEVICE AND METHOD FOR ISOLATING A TRIGGER SIGNAL OF A LIDAR SENSOR AND TEST SYSTEM

This nonprovisional application claims priority under 35 U.S.C. § 119(a) to German Patent Application No. 10 2021 106 220.9, which was filed in Germany on Mar. 15, 2021, and which is herein incorporated by reference.

BACKGROUND OF THE INVENTION

Field of the Invention

The present invention relates to a device for isolating a trigger signal for a test system of a LiDAR sensor. The invention further relates to a test system for a LiDAR sensor. The present invention further relates to a method for isolating a trigger signal for a test system of a LiDAR sensor.

Description of the Background Art

LiDAR (an acronym for Light Detection and Ranging) light measurement systems are used for optical distance and speed measurement, among other applications. LiDAR light measurement systems emit light and measure the time it takes for the light to return to the LiDAR light measurement system after being reflected off an object. The distance of the object from the LiDAR light measurement system follows from the known speed of light.

Examples for fields of application for LiDAR light measurement systems are mobile instruments for optical distance measurement and LiDAR light measurement systems for the automotive application field, namely, driver assistance systems and autonomous driving, as well as for aerospace applications.

DE 102007057372 A1 discloses a test system for LiDAR sensors with a trigger unit which, in response to receiving a signal from a LiDAR sensor under test, controls a signal generator such that a predefined synthetically generated or recorded optical signal is output by a signal generation unit of the signal generator.

DE 102017110790 A1, which corresponds to U.S. Pat. No. 10,955,533, discloses a simulation apparatus for a LiDAR light measurement system having a LiDAR light reception sensor, where a light transmitter is present in the plane of the LiDAR light reception sensor, wherein a further light transmitter is arranged next to the light transmitter in the plane of the LiDAR light reception sensor, and wherein a computer monitors the activation of the LiDAR light reception sensor and the time interval for emitting a light signal via the light transmitter and/or the further light transmitter and registers the signal input of the light signal from the light transmitter or the further light transmitter.

A problem with testing LiDAR sensors using a signal generator is that the trigger signal emitted by a transmitter unit of the LiDAR sensor reflects off surrounding surfaces such as, for example, the trigger unit, i.e., the receiver unit of the simulation device, and is thus detectable by a receiver unit of the LiDAR sensor, which can lead to undesired detection results or falsification of the trigger signal synthetic reflection generated by the signal generator.

Consequently, there is a need to improve existing devices and methods for testing a LiDAR sensor to enable effective isolation of the trigger signal.

SUMMARY OF THE INVENTION

It is therefore an object of the invention to provide a device and method for isolating a trigger signal of a LiDAR sensor, and a corresponding test system using the device and enabling effective isolation of the trigger signal.

The object is achieved according to the invention by a device for isolating a trigger signal for a test system of a LiDAR sensor. The object is also achieved further by a test system for a LiDAR sensor. The object is achieved further according to the invention by a method for isolating a trigger signal for a test system of a LiDAR sensor.

The invention relates to a device for isolating a trigger signal for a test system of a LiDAR sensor.

The device comprises a converging lens, connectable to a trigger detector via an optical transmission medium, or a trigger detector, wherein the converging lens or the trigger detector is configured to receive a trigger signal, in particular a laser pulse, generated by a LiDAR sensor.

The device further comprises an optical element which is arranged in a signal path of the trigger signal before the converging lens or the trigger detector and which is designed to allow the trigger signal to pass and to at least partially absorb a back reflection, in particular reflected off a surface, of the trigger signal that has passed through the optical element.

The invention further relates to a test system for a LiDAR sensor. The test system comprises a LiDAR sensor, generating a trigger signal, and a device of the invention for isolating the trigger signal.

The test system comprises further a signal generator, wherein the trigger detector is configured, in response to receiving the trigger signal from the LiDAR sensor under test, to control the signal generator, to generate a simulated back reflection of the trigger signal, and to transmit it to a receiver of the LiDAR sensor using a predefined number of diodes or lighting elements.

The invention relates moreover to a method for isolating a trigger signal for a test system of a LiDAR sensor.

The method comprises receiving a trigger signal, in particular a laser pulse, generated by a LiDAR sensor, through a converging lens, connected to a trigger detector via an optical transmission medium, or through a trigger detector.

In addition, the method comprises passing the trigger signal through an optical element arranged in a signal path of the trigger signal before the converging lens or the trigger detector.

Furthermore, the method comprises an at least partial absorption of a back reflection, in particular reflected off a surface, of the trigger signal, passed through the optical element, by means of the optical element.

An idea of the present invention is to simplify the adaptation of a LiDAR over-the-air test system to the LiDAR sensor under test; i.e., no sensor-specific mechanics are required for shadowing the laser pulse. The LiDAR over-the-air simulation of multi-laser sensors and monostatic sensor architectures can only be realized with the optical isolator or optical element without intervention in the sensor internals.

The optical element can be formed by an optical isolator, in particular a Faraday isolator, wherein the optical isolator has a Faraday rotator disposed between a first polarizer and a second polarizer.

The optical isolator advantageously allows the trigger signal to pass in a first direction and blocks it to the greatest extent possible in a second direction opposite to the first direction.

An optical axis of the first polarizer can have an orientation that coincides with a plane of polarization of the trigger signal, wherein the Faraday rotator is designed to rotate the polarization of the trigger signal by 45° in a predefined direction of rotation, and wherein an optical axis of the second polarizer is oriented 45° in the predefined rotational direction with respect to the first polarizer.

The change in the plane of polarization of the trigger signal advantageously causes the polarization of the trigger signal, which is rotated by 45° in the specified direction of rotation, to be reflected back in the direction of the LiDAR sensor when it strikes the surface, and thus results in a rotational polarization that is reversed from the point of view of the optical isolator.

The Faraday rotator can be designed to rotate the polarization of the back reflection of the trigger signal, passed through the optical isolator, by 45° in the predefined direction of rotation, so that the back reflection, passed through the Faraday rotator, is oriented orthogonally to the optical axis of the first polarizer.

Due to the renewed rotation of the polarization of the trigger signal by 45° in the predefined direction of rotation, the back reflection of the trigger signal has a polarization rotated by 90°, so that the back reflection is essentially blocked when it strikes the first polarizer.

The optical element can be formed by a delay element, in particular a λ/4 waveplate, which is designed to circularly polarize the particularly linearly polarized trigger signal, generated by the LiDAR sensor.

The circular polarization advantageously has the effect that the back reflection of the carrier signal is damped or blocked to the greatest extent possible when it strikes the delay element again.

A polarizer, in particular a linear polarizer, can be arranged in the signal path of the trigger signal before the delay element. This is necessary if the trigger signal emitted by the LiDAR sensor is not to be linearly polarized.

The optical power of the back reflection of the trigger signal, passed through the optical element, after passing through the optical element twice, can be below a detection threshold of a receiver of the LiDAR sensor.

Thus, it can be ensured that the receiver of the LiDAR sensor only receives the synthetic back reflection, generated by the signal generator, of the trigger signal and no actual back reflection of the trigger signal.

The optical element can be designed to attenuate an optical power of the trigger signal by 50-70%, in particular by 65%, in the first pass through the optical element, and to provide a total attenuation of the trigger signal and its back reflection, again passing through the optical element, by more than 99%, in particular 99.9%.

In this way, it can be advantageously achieved that the remaining portion of the back reflection of the trigger signal is below a detection threshold of the LiDAR sensor.

The optical element and the converging lens or the trigger detector can be arranged in a covering cap, attachable to a transmitter unit of the LiDAR sensor, or on a carrier device arranged in the signal path of the trigger signal.

The provision of the covering cap or the carrier device advantageously enables a compact arrangement of the device for isolating the trigger signal, whereby it is also achieved that the trigger signal passes exclusively through the optical element or that the back reflection of the optical signal strikes the optical element.

The trigger detector can have a predefined number of photosensitive diodes which are configured to transmit the received trigger signal as an electrical signal to a signal generator. Thus, an effective conversion of the optical signal into an electrical signal can be achieved.

The optical element can be arranged at least in the region of an opening angle of the transmitter unit of the LiDAR sensor.

This advantageously ensures that the trigger signal emitted by the LiDAR sensor passes completely through the optical element.

The LiDAR sensor can be formed by a flash LiDAR or a mechanically scanning LiDAR.

The device of the invention for isolating the trigger signal can thus be used with all common embodiments of LiDAR sensors.

The features, described herein, of the device for isolating a trigger signal of a LiDAR sensor are equally applicable to the method according to the invention for isolating a trigger signal of a LiDAR sensor and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
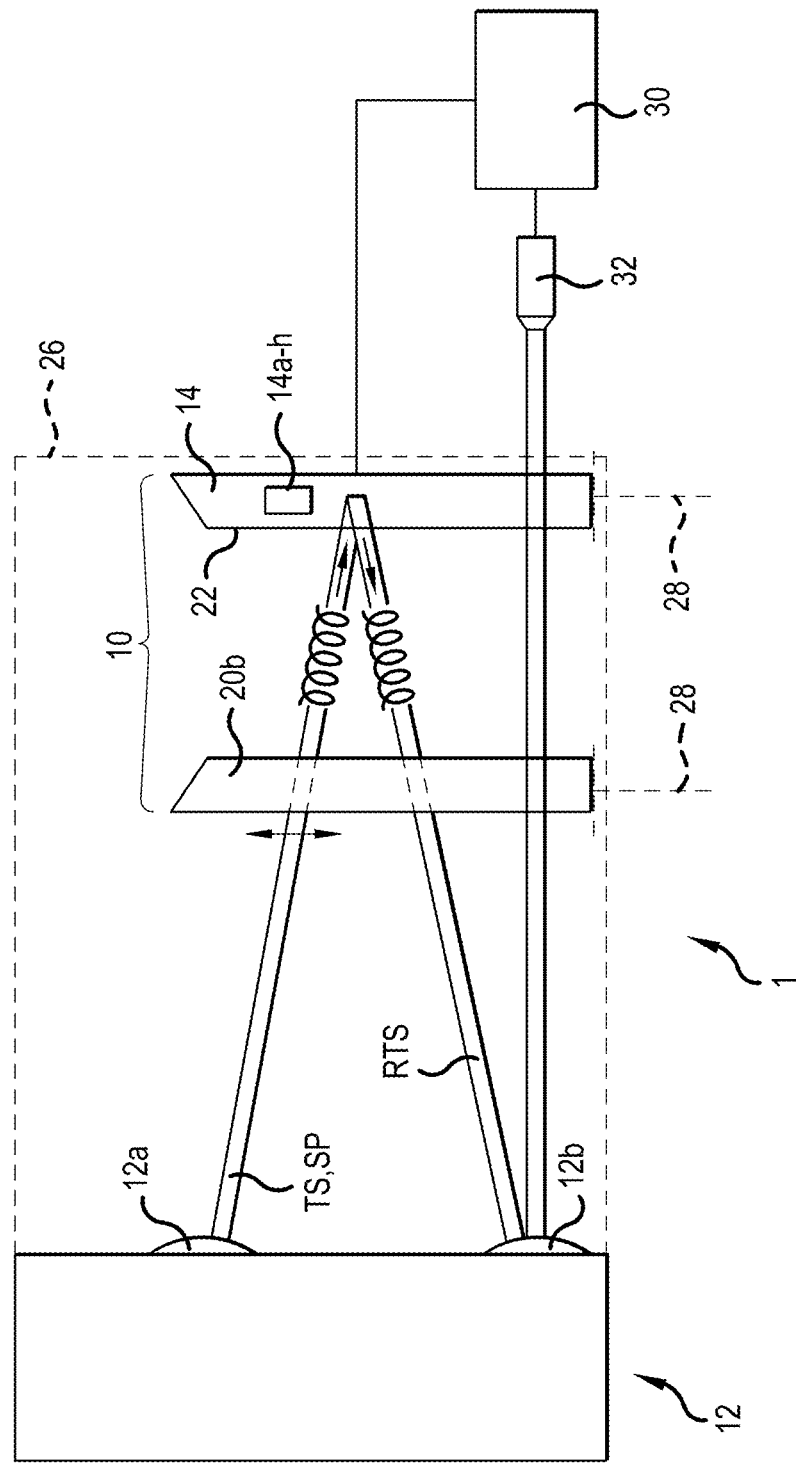
FIG. 1a shows a schematic diagram of a test system for a LiDAR sensor with a device for isolating a trigger signal according to an example embodiment of the invention.

The device shown in FIG. 1a for isolating a trigger signal for a test system 1 of a LiDAR sensor 12 comprises a trigger detector 14, which is configured to receive a trigger signal TS, in particular a laser pulse, generated by a LiDAR sensor 12.

The device further comprises an optical element 20b which is arranged in a signal path SP of the trigger signal TS in front of trigger detector 14 and which is designed to allow the trigger signal TS to pass and to at least partially absorb a back reflection RTS the trigger signal TS that has passed through optical element 20b and that has been reflected off a surface 22 of the trigger detector 14.

Optical element 20b is formed by a delay element 20b, in particular a λ/4 waveplate, which is designed to circularly polarize the particularly linearly polarized trigger signal TS, generated by LiDAR sensor 12.

In this case, the optical power of the back reflection RTS of the trigger signal TS, passed through optical element 20b, after passing through optical element 20b twice, is below a detection threshold of a receiver of LiDAR sensor 12.

Optical element 20b is configured to attenuate an optical power of the trigger signal TS by 50-70%, in particular by 65%, when it first passes through optical element 20b. Further, optical element 20b is configured to provide a total attenuation of the trigger signal TS and its back reflection RTS, passing optical element 20b again, by more than 99%, in particular 99.9%.

Optical element 20b and trigger detector 14 are disposed in a covering cap 26 attachable to a transmitter unit 12a of LiDAR sensor 12. Alternatively, covering cap 26 can be omitted, for example.

Alternatively, optical element 20b and trigger detector 14 can be arranged, for example, on a carrier device 28 arranged in the signal path SP of the trigger signal TS.

Trigger detector 14 has a predetermined number of photosensitive diodes 14a-14h, which are configured to transmit the received trigger signal TS as an electrical signal to a signal generator 30.

Optical element 20b is arranged at least in the region of an opening angle of transmitter unit 12a of LiDAR sensor 12. Alternatively, optical element 20b is also arranged in the region of the radiation angle of transmitter unit 32 of signal unit 30.

Test system 1 for LiDAR sensor 12 further has a signal generator 30. Trigger detector 14 in this case is configured, in response to receiving the trigger signal TS from LiDAR sensor 12 under test, to control signal generator 30, to generate a simulated back reflection RTS of the trigger signal TS, and to transmit it to a receiver 12b of LiDAR sensor 12 using a predefined number of diodes of a transmitter unit 32 of signal generator 30.

LiDAR sensor 12 is formed by a flash LiDAR.

Figure 1B:
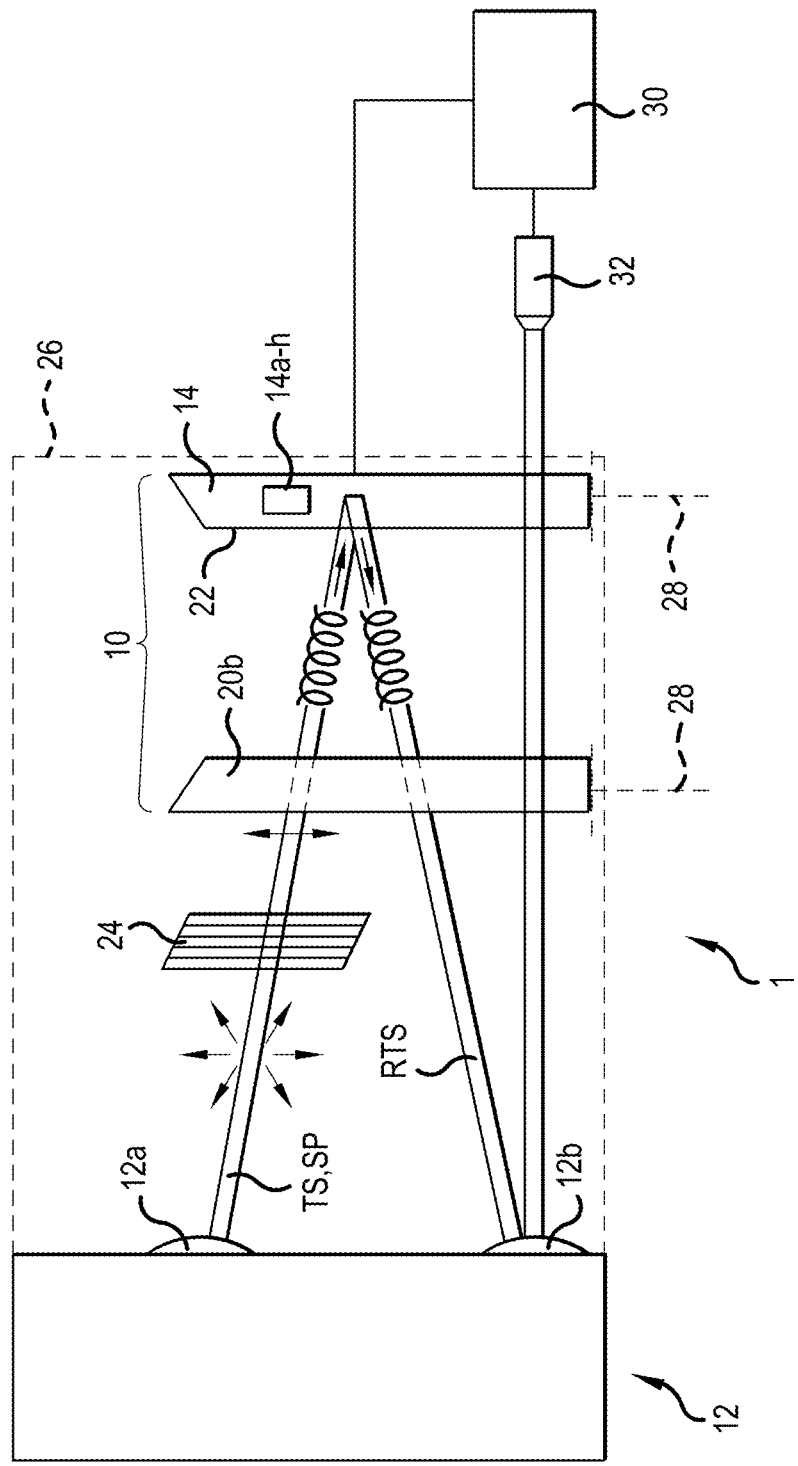
FIG. 1b shows a schematic diagram of the test system for the LiDAR sensor with the device for isolating the trigger signal according to an example embodiment of the invention.

FIG. 1b shows a schematic diagram of the test system for the LiDAR sensor with the device for isolating the trigger signal according to a further preferred embodiment of the invention.

The arrangement shown in FIG. 1b differs from the arrangement shown in FIG. 1a in that a polarizer 24, in particular a linear polarizer, is arranged in the signal path SP of the trigger signal TS before delay element 20b, because in the embodiment shown in FIG. 1b the LiDAR sensor emits an unpolarized trigger signal TS.

If alternatively, the trigger signal TS should be polarized, optimization can be achieved via the efficiency of the optical isolator by rotating.

Figure 2:
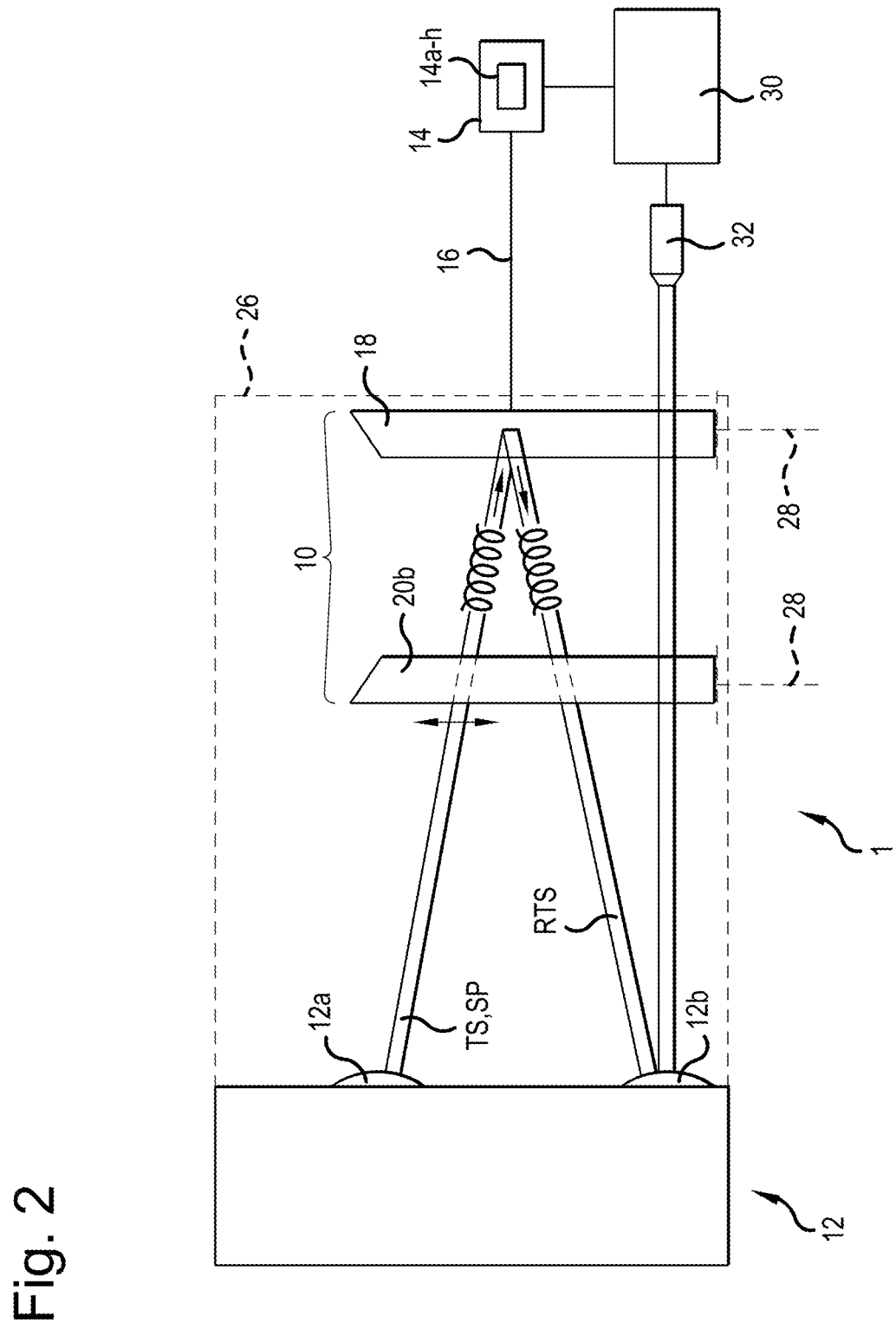
FIG. 2 shows a schematic diagram of the test system for the LiDAR sensor with the device for isolating the trigger signal according to an example embodiment of the invention.

FIG. 2 shows a schematic diagram of the test system for the LiDAR sensor with the device for isolating the trigger signal according to a further preferred embodiment of the invention.

Device 10 for isolating a trigger signal for a test system 1 of a LiDAR sensor 12 comprises a converging lens 18 connectable to a trigger detector 14 through an optical transmission medium 16, wherein converging lens 18 is configured to receive a trigger signal TS, in particular a laser pulse, generated by a LiDAR sensor 12.

Device 10 further comprises an optical element 20b which is arranged in a signal path SP of the trigger signal TS before converging lens 18 and which is designed to allow the trigger signal TS to pass and to at least partially absorb a back reflection RTS, in particular reflected off a surface 22, of the trigger signal TS that has passed through optical element 20a, 20b.

Figure 3:
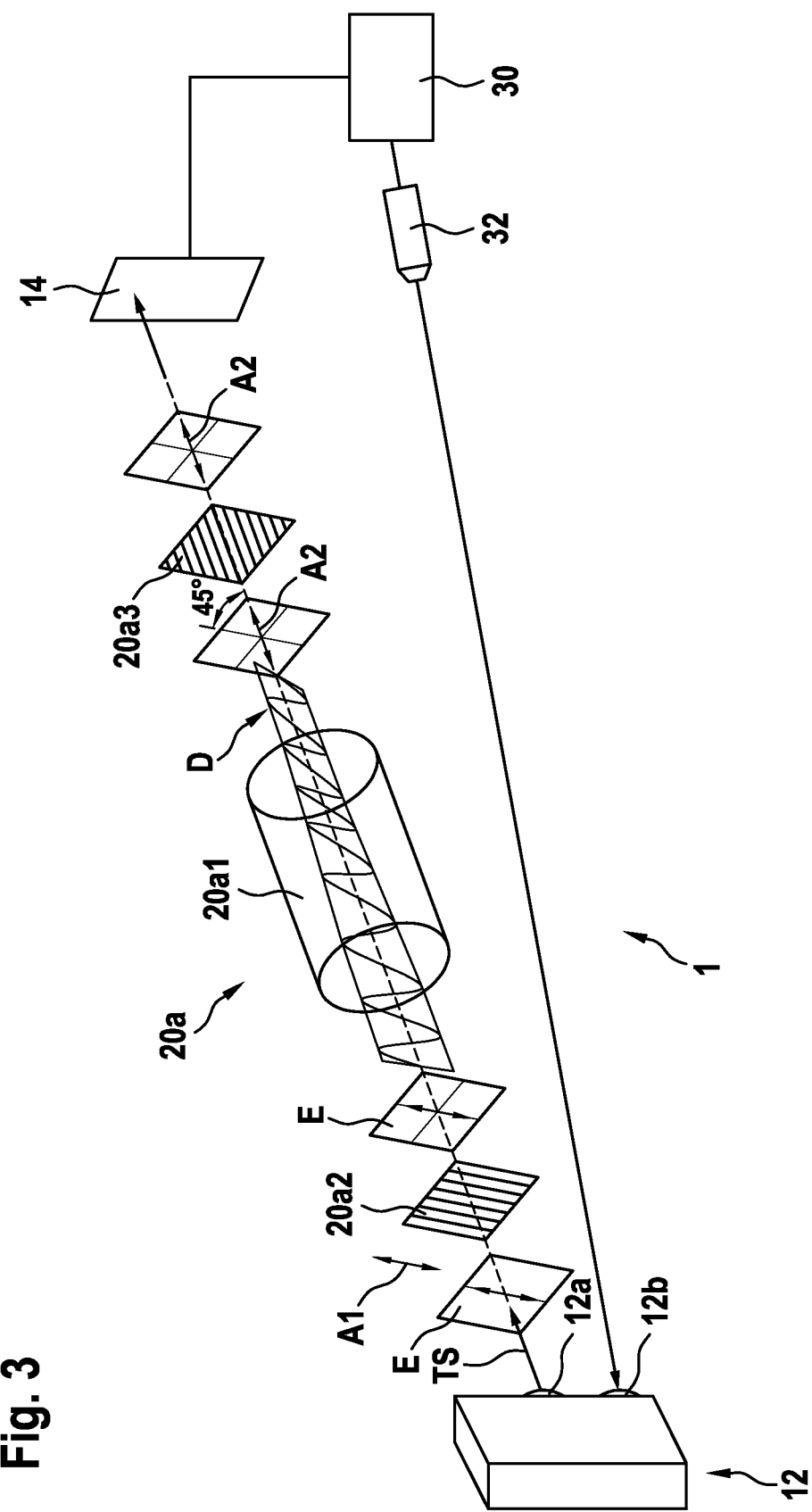
FIG. 3 shows a schematic diagram of the test system for the LiDAR sensor with the device for isolating the trigger signal according to an example embodiment of the invention.

FIG. 3 shows a schematic diagram of the test system for the LiDAR sensor with the device for isolating the trigger signal according to a further preferred embodiment of the invention.

Optical element 20a is formed by an optical isolator 20a, in particular a Faraday isolator, wherein optical isolator 20a has a Faraday rotator 20a1 disposed between a first polarizer 20a2 and a second polarizer 20a3.

An optical axis A1 of first polarizer 20a2 has an orientation that coincides with a plane of polarization E of the trigger signal TS. Further, Faraday rotator 20a1 is designed to rotate the polarization of the trigger signal by 45° in a predefined direction of rotation D. Furthermore, an optical axis A2 of the second polarizer is oriented by 45° in the predefined direction of rotation D with respect to first polarizer 20a2.

FIG. 3 shows the arrangement of optical element 20a in the transmission area of transmitter unit 12a of LiDAR sensor 12. Alternatively, optical element 20a is at the same time also arranged in the radiation region of transmitter unit 32 of signal unit 30. For reasons of better perceptibility, this variant has not been illustrated.

Figure 4:
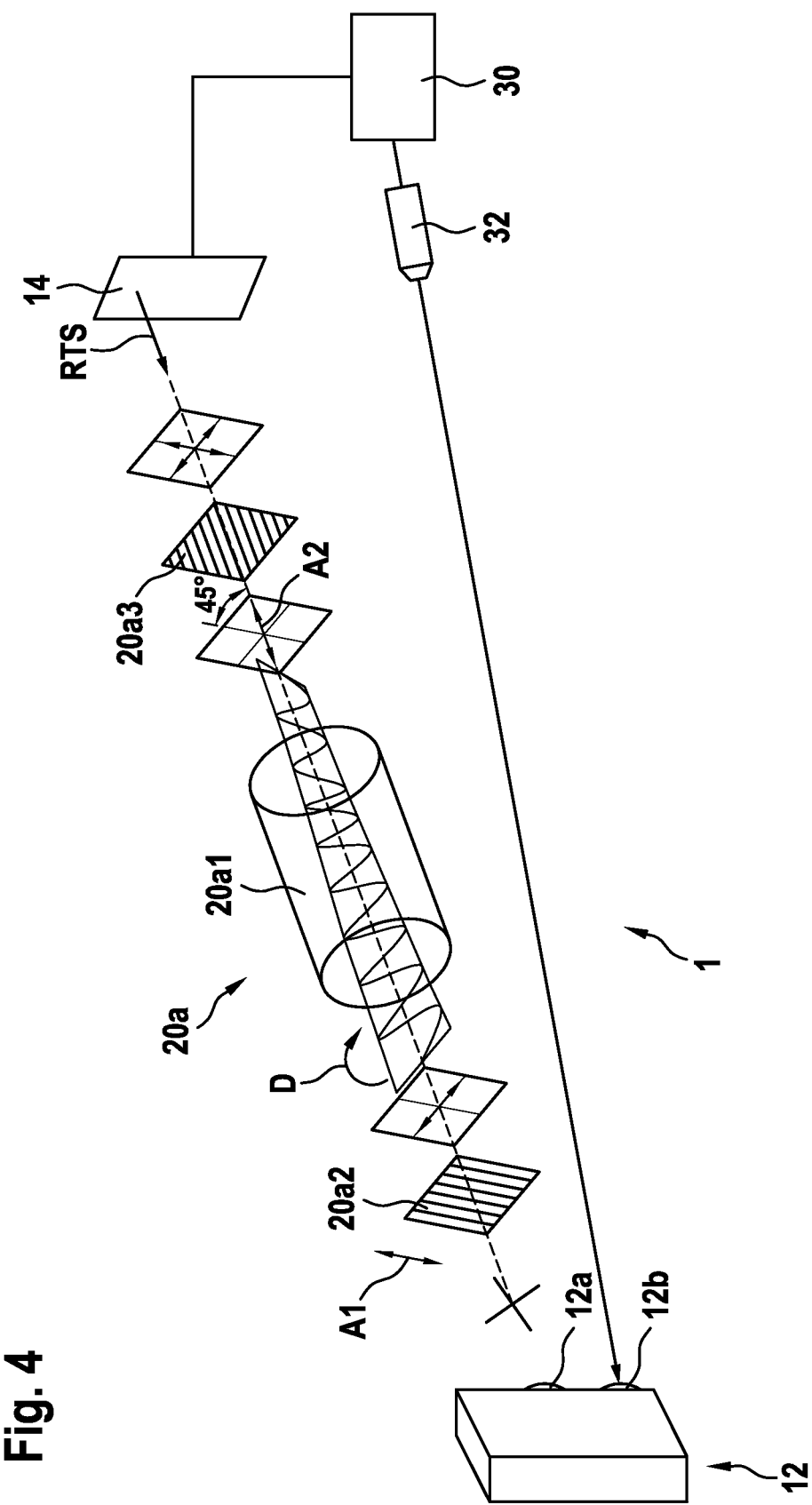
FIG. 4 shows a schematic diagram of the test system for the LiDAR sensor with the device for isolating the trigger signal according to an example embodiment of the invention.

FIG. 4 shows a schematic diagram of the test system for the LiDAR sensor with the device for isolating the trigger signal according to a further preferred embodiment of the invention.

Faraday rotator 20a1 is designed to rotate the polarization of the back reflection RTS of the trigger signal TS, passed through optical isolator 20a, by 45° in the predefined direction of rotation D, so that the back reflection RTS, passed through Faraday rotator 20a1, is oriented orthogonally to the optical axis A1 of the first polarizer.

Figure 5:
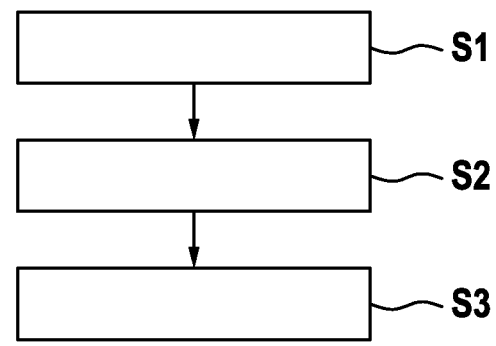
FIG. 5 shows a flowchart of a method for isolating a trigger signal for a test system of a LiDAR sensor according to an example embodiment of the invention.

FIG. 5 shows a flowchart of a method for isolating a trigger signal for a test system of a LiDAR sensor according to the preferred embodiment of the invention.

The method comprises receiving S1 a trigger signal TS, in particular a laser pulse, generated by a LiDAR sensor 12 through a converging lens 18, connected to a trigger detector 14 via an optical transmission medium 16, or through a trigger detector 14.

The method comprises passing S2 the trigger signal TS through an optical element arranged in a signal path SP of the trigger signal TS before converging lens 18 or trigger detector 14.

Moreover, the method comprises at least partially absorbing S3 a back reflection RTS, in particular reflected off a surface 22, of the trigger signal TS, passed through optical element 20a, 20b, by means of optical element 20a, 20b.

Although specific embodiments have been illustrated and described herein, it will be understood by the skilled artisan that there are a number of alternative and/or equivalent implementations. It should be noted that the exemplary embodiment or exemplary embodiments are examples only and are not intended to restrict the scope, applicability, or configuration in any way.

Rather, the foregoing summary and detailed description provide the skilled artisan with convenient instructions for implementing at least one exemplary embodiment, where it is understood that various changes in the functional scope and arrangement of the elements can be made without departing from the scope of the appended claims and their legal equivalents.

In general, this application intends to cover modifications or adaptations or variations of the embodiments disclosed herein.

The LiDAR sensor can, for example, be formed by a mechanical-rotating scanning LiDAR. In this case, device 10 for isolating the trigger signal for test system 1 of LiDAR sensor 12 would be arranged at an angle of 360° around LiDAR sensor 12.

Further, some aspects of the embodiments shown in FIGS. 1a, 1b, 2, 3, and 4 are respectively transferable to the other embodiments. For example, the features described with reference to FIG. 1a that the optical power of the back reflection RTS of the trigger signal TS, passed through optical element 20b, after passing through optical element 20b twice, is below a detection threshold of a receiver of LiDAR sensor 12 are transferable to the embodiments shown in FIGS. 1b, 2, 3, and 4.

Further, the features that optical element 20b is configured to attenuate an optical power of the trigger signal TS by 50-70%, in particular by 65%, in the first pass through optical element 20a, 20b, and, further, that optical element 20b is configured to provide a total attenuation of the trigger signal TS and its back reflection RTS, passing optical element 20b again, by more than 99%, in particular 99.9%, are transferable to the embodiments shown in FIGS. 1b, 2, 3, and 4.

Furthermore, the features that optical element 20b and trigger detector 14 are arranged in a covering cap 26 attachable to a transmitter unit 12a of LiDAR sensor 12 or that optical element 20b and trigger detector 14 are arranged, for example, on a carrier device 28 arranged in the signal path SP of the trigger signal TS are transferable to the embodiments shown in FIGS. 1b, 2, 3, and 4.

Furthermore, the features that trigger detector 14 has a predefined number of photosensitive diodes 14a-14h which are configured to transmit the received trigger signal TS as an electrical signal to a signal generator 30, and that optical element 20a, 20b is arranged at least in the region of an opening angle of transmitter unit 12a of LiDAR sensor 12 are applicable to the embodiments shown in FIGS. 1b, 2, 3, and 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for isolating a trigger signal for a test system of a LIDAR sensor, the device comprising:
   a trigger detector;
   a converging lens connectable to the trigger detector via an optical transmission medium, the converging lens or the trigger detector being configured to receive a trigger signal or a laser pulse, generated by a LIDAR sensor; and
   an optical element arranged in a signal path of the trigger signal before the converging lens or the trigger detector and which is designed to allow the trigger signal to pass and to at least partially absorb a back reflection of the trigger signal that has passed through the optical element and which is reflected off a surface of the trigger detector.

2. The device according to claim 1, wherein the optical element is formed by an optical isolator, and
   wherein the optical isolator has a Faraday rotator disposed between a first polarizer and a second polarizer.

3. The device according to claim 2, wherein an optical axis of the first polarizer has an orientation that coincides with a plane of polarization of the trigger signal, wherein the Faraday rotator is designed to rotate the polarization of the trigger signal by 45° in a predefined direction of rotation, and wherein an optical axis of the second polarizer is oriented by 45° in the predefined rotational direction with respect to the first polarizer.

4. The device according to claim 3, wherein the Faraday rotator is designed to rotate the polarization of the back reflection of the trigger signal, passed through optical isolator by 45° in the predefined direction of rotation so that the back reflection passed through the Faraday rotator is oriented orthogonally to the optical axis of the first polarizer.

5. The device according to claim 1, wherein the optical element is formed by a delay element, which is designed to circularly polarize the particularly linearly polarized trigger signal generated by the LiDAR sensor.

6. The device according to claim 5, wherein a polarizer is arranged in the signal path of the trigger signal before the delay element.

7. The device according to claim 1, wherein the optical power of the back reflection of the trigger signal passed through the optical element, after passing through the optical element twice, is below a detection threshold of a receiver of the LIDAR sensor.

8. The device according to claim 7, wherein the optical element is designed to attenuate an optical power of the trigger signal by 50-70%, in the first pass through the optical element, and to provide a total attenuation of the trigger signal and the back reflection, again passing through the optical element, by more than 99%.

9. The device according to claim 1, wherein the optical element and the converging lens or the trigger detector are arranged in a covering cap, attachable to a transmitter unit of the LiDAR sensor or on a carrier device arranged in the signal path of the trigger signal.

10. The device according to claim 9, wherein the trigger detector has a predefined number of photosensitive diodes, which are configured to transmit the received trigger signal as an electrical signal to a signal generator.

11. The device according to claim 9, wherein the optical element is arranged at least in the region of an opening angle of the transmitter unit of the LiDAR sensor.

12. A test system for a LIDAR sensor, the test system comprising:
   a LIDAR sensor generating a trigger signal;
   a device to isolate the trigger signal according to claim 1; and
   a signal generator,
   wherein the trigger detector is configured, in response to receiving the trigger signal from the LiDAR sensor under test, to control the signal generator, to generate a simulated back reflection of the trigger signal, and to transmit the simulated back reflection to a receiver of the LiDAR sensor using a predefined number of photosensitive diodes.

13. The test system according to claim 12, wherein the LiDAR sensor is formed by a flash LiDAR or a mechanical rotating scanning LiDAR.

14. A method for isolating a trigger signal for a test system of a LIDAR sensor, the method comprising:
   receiving a trigger signal generated by a LiDAR sensor through a converging lens connected to a trigger detector via an optical transmission medium or through a trigger detector;

passing the trigger signal through an optical element arranged in a signal path of the trigger signal before the converging lens or the trigger detector; and at least partially absorbing a back reflection, which has passed through the optical element and is reflected off a surface of the trigger detector.

15. The device according to claim 1, wherein the optical isolator is a Faraday isolator.

16. The device according to claim 1, wherein the delay element is a λ/4 waveplate.

17. The device according to claim 5, wherein the polarizer is a linear polarizer.

18. The device according to claim 7, wherein the optical element is designed to attenuate the optical power of the trigger signal by 65%.

19. The device according to claim 7, wherein the optical element is designed to provide a total attenuation of the trigger signal and the back reflection, again passing through the optical element, by 99.9%.

20. The method according to claim 14, wherein the trigger signal is a laser pulse.

\* \* \* \* \*